United States Patent
Ye et al.

(10) Patent No.: US 12,382,028 B2
(45) Date of Patent: Aug. 5, 2025

(54) SYSTEMS AND METHODS FOR SIGNALING OF DOWNSAMPLING FILTERS FOR CHROMA FROM LUMA INTRA PREDICTION MODE

(71) Applicant: Tencent America LLC, Palo Alto, CA (US)

(72) Inventors: Jing Ye, Palo Alto, CA (US); Liang Zhao, Palo Alto, CA (US); Xin Zhao, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 85 days.

(21) Appl. No.: 18/144,042

(22) Filed: May 5, 2023

(65) Prior Publication Data
US 2024/0179304 A1    May 30, 2024

Related U.S. Application Data
(60) Provisional application No. 63/428,714, filed on Nov. 29, 2022.

(51) Int. Cl.
*H04N 19/11* (2014.01)
*H04N 19/117* (2014.01)
(Continued)

(52) U.S. Cl.
CPC .......... *H04N 19/11* (2014.11); *H04N 19/117* (2014.11); *H04N 19/136* (2014.11);
(Continued)

(58) Field of Classification Search
CPC ...... H04N 19/11; H04N 19/59; H04N 19/593; H04N 19/80; H04N 19/70; H04N 19/186;
(Continued)

(56) References Cited

U.S. PATENT DOCUMENTS

| | | | |
|---|---|---|---|
| 2004/0066854 A1 | 4/2004 | Hannuksela | |
| 2004/0213345 A1* | 10/2004 | Holcomb | H04N 19/527 375/240.03 |

(Continued)

OTHER PUBLICATIONS

Benjamin Bross et al., "Versatile Video Coding Editorial Refinements on Draft 10", Document: JVET-T2001-v2, Joint Video Experts Team (JVET) of ITU-T SG 16 WP 3 and ISO/IEC JTC 1/SC 29, 20th Meeting, by teleconference, Oct. 7-16, 2020, 541 pgs.

(Continued)

*Primary Examiner* — Kathleen V Nguyen
(74) *Attorney, Agent, or Firm* — Morgan, Lewis & Bockius LLP

(57) ABSTRACT

The various implementations described herein include methods and systems for decoding video. In one aspect, a method includes receiving a video stream having a sequence of frames. The sequence of frames includes one or more key frames. Each key frame has a respective downsampling filter type. The method includes, in accordance with a determination that a current frame corresponds to a first key frame, retrieving, from the video stream, a syntax element associated with a first downsampling filter type associated with the first key frame. The method includes a luma block of the current frame and a predefined set of frames immediately after the current frame using the first downsampling filter type to obtain downsampled frames. The method includes predicting a chroma block of the current frame based on the downsampled frames.

20 Claims, 10 Drawing Sheets

(51) Int. Cl.
  *H04N 19/136* (2014.01)
  *H04N 19/159* (2014.01)
  *H04N 19/172* (2014.01)
  *H04N 19/176* (2014.01)
  *H04N 19/186* (2014.01)
  *H04N 19/593* (2014.01)
  *H04N 19/70* (2014.01)
  *H04N 19/80* (2014.01)

(52) U.S. Cl.
  CPC ......... *H04N 19/159* (2014.11); *H04N 19/172* (2014.11); *H04N 19/176* (2014.11); *H04N 19/186* (2014.11); *H04N 19/593* (2014.11); *H04N 19/70* (2014.11); *H04N 19/80* (2014.11)

(58) Field of Classification Search
  CPC ... H04N 19/159; H04N 19/136; H04N 19/117
  See application file for complete search history.

(56) References Cited

U.S. PATENT DOCUMENTS

| | | |
|---|---|---|
| 2013/0077681 A1 | 3/2013 | Chen et al. |
| 2013/0136174 A1 | 5/2013 | Xu et al. |
| 2014/0119712 A1* | 5/2014 | Jang ..................... G11B 27/105 386/248 |
| 2014/0294078 A1 | 10/2014 | Seregin et al. |
| 2015/0049819 A1* | 2/2015 | Lee ........................ H04N 19/91 375/240.23 |
| 2019/0045217 A1* | 2/2019 | Gokhale .............. H04N 19/172 |
| 2021/0092395 A1 | 3/2021 | Zhang et al. |
| 2021/0160514 A1* | 5/2021 | Ma ....................... H04N 19/186 |

OTHER PUBLICATIONS

Peter de Rivaz et al., "AV1 Bitstream & Decoding Process Specification", The Alliance for Open Media, Jan. 8, 2019, 681 pgs.

Xin Zhao et al., "Tool Description for AV1 and Libaom", Document: CWG-B078_v1, Alliance for Open Media Codec Working Group, Oct. 4, 2021, 41 pgs.

Yue Chen et al., "An Overview of Core Coding Tools in the AV1 Video Codec", 2018 IEEE, 5 pgs.

Tencent Technology, ISRWO, PCT/US2023/021321, Aug. 4, 2023, 15 pgs.

* cited by examiner

SYSTEMS AND METHODS FOR SIGNALING OF DOWNSAMPLING FILTERS FOR CHROMA FROM LUMA INTRA PREDICTION MODE

RELATED APPLICATIONS

This application claims priority to U.S. Provisional Patent Application No. 63/428,714, entitled "Signaling of Downsampling Filters for Chroma from Luma Intra Prediction Mode" filed Nov. 29, 2022, which is hereby incorporated by reference in its entirety.

TECHNICAL FIELD

The disclosed embodiments relate generally to video coding, including but not limited to systems and methods for signaling of downsampling filters for chroma from luma intra prediction mode.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored.

Multiple video codec standards have been developed. For example, video coding standards include AOMedia Video 1 (AV1), Versatile Video Coding (VVC), Joint Exploration test Model (JEM), High-Efficiency Video Coding (HEVC/H.265), Advanced Video Coding (AVC/H.264), and Moving Picture Expert Group (MPEG) coding. Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality.

HEVC, also known as H.265, is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC), also known as H.266, is a video compression standard intended as a successor to HEVC. ITU-T and ISO/IEC published the VVC/H.266 standard in 2020 (version 1) and 2022 (version 2). AV1 is an open video coding format designed as an alternative to HEVC. On Jan. 8, 2019, a validated version 1.0.0 with Errata 1 of the specification was released.

SUMMARY

The present disclosure describes various techniques for signaling a downsampling filter used in cross component intra prediction mode. Chroma from luma (CfL) prediction is an efficient video coding tool that models chroma pixels as a linear function of the coincident reconstructed luma pixels. When there are multiple downsampling filters used in CfL mode, there is a need to signal the filters at high level syntax. Current signaling approaches may have two issues: First, results may be different between sequential running and parallel running of multiple group of pictures (GOPs); Second, there may be redundant signaling overhead for inter coded frames.

Accordingly, there is a need for improved methods and systems for signaling a downsampling filter in CfL mode. The present disclosure describes various techniques for signaling a downsampling filter used in cross component intra prediction mode. The disclosed techniques can used by a decoder of video bitstreams to improve the quality and/or efficiency of the decoding. A video encoder may also implement these techniques during encoding (e.g., to reconstruct encoded frames and/or test hypotheses).

In accordance with some embodiments, a method of video decoding is provided. The method includes receiving a video stream having a sequence of frames, the sequence of frames including one or more key frames, and each key frame having a respective downsampling filter type. The method includes, in accordance with a determination that a current frame corresponds to a first key frame of the one or more key frames: (i) retrieving, from the video stream, a syntax element associated with a first downsampling filter type associated with the first key frame; (ii) downsampling a luma block of the current frame and a predefined set of frames immediately after the current frame using the first downsampling filter type to obtain downsampled frames; and (iii) predicting a chroma block of the current frame based on the downsampled frames.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and/or a decoder component.

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for coding video. Such methods, devices, and systems may complement or replace conventional methods, devices, and systems for video coding.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

In accordance with common practice, the various features illustrated in the drawings are not necessarily drawn to scale, and like reference numerals can be used to denote like features throughout the specification and figures.

DETAILED DESCRIPTION

The present disclosure describes signaling a downsampling filter type in a chroma from luma (CfL) intra prediction mode of video coding. A video stream having a sequence of frames is received. The sequence of frames includes one or more key frames, and each key frame has a respective downsampling filter type. In accordance with a determination that a current frame corresponds to a first key frame of the one or more key frames: a syntax element associated with a first downsampling filter type associated with the first key frame is retrieved from the video bitstream. A luma block (e.g., block of pixels) of the current frame and a predefined set of frames immediately after the current frame are downsampled using the first downsampling filter type to obtain downsampled frames. A chroma block (e.g., block of pixels) of the current frame is predicted based on the downsampled frames.

Example Systems and Devices

Figure 1:
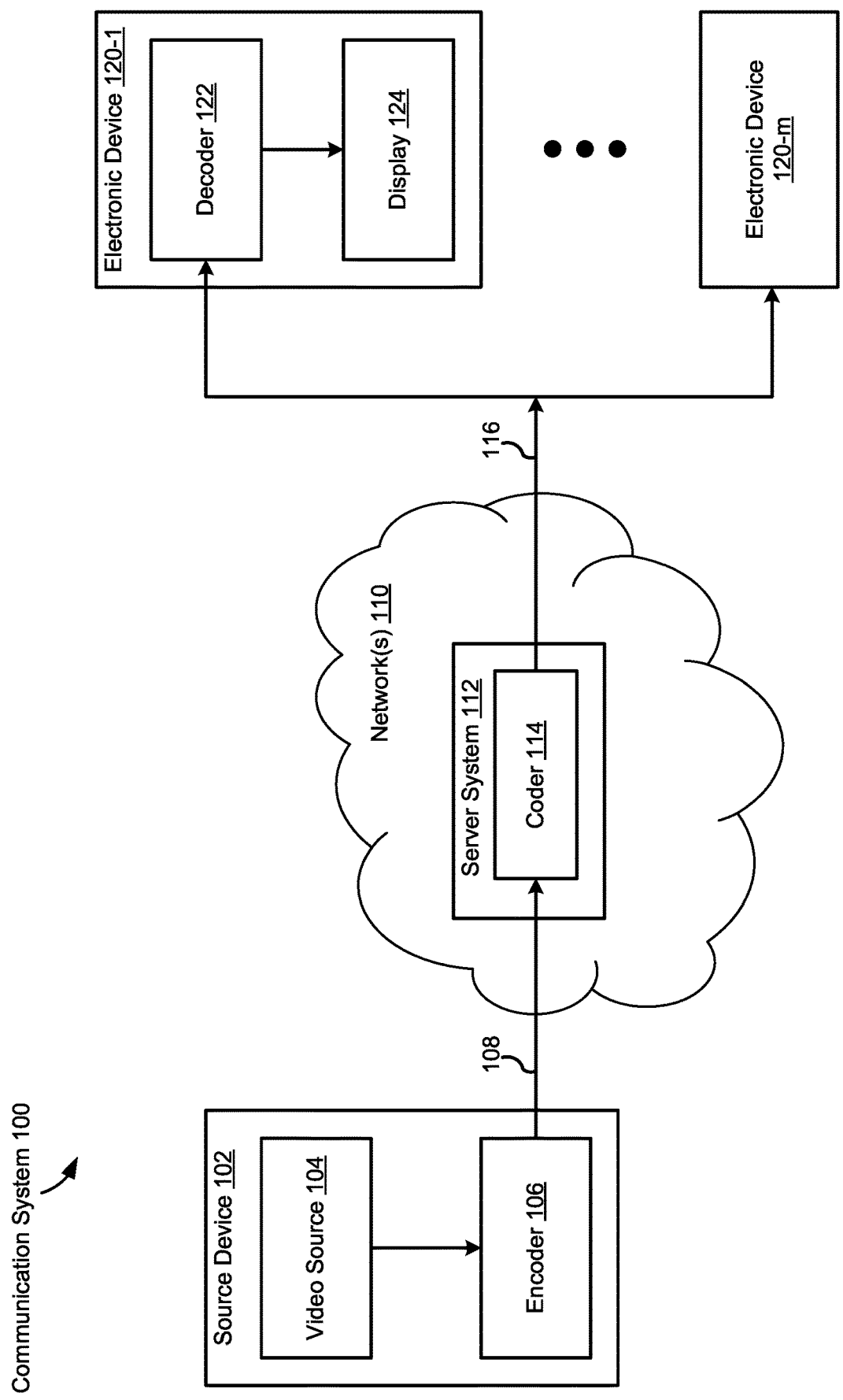
FIG. 1 is a block diagram illustrating an example communication system in accordance with some embodiments.

FIG. 1 is a block diagram illustrating a communication system 100 in accordance with some embodiments. The communication system 100 includes a source device 102 and a plurality of electronic devices 120 (e.g., electronic device 120-1 to electronic device 120-m) that are communicatively coupled to one another via one or more networks.

In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video data to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108.

In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 to recover and optionally display the video pictures.

In some embodiments, the transmissions discussed above are unidirectional data transmissions. Unidirectional data transmissions are sometimes utilized in in media serving applications and the like. In some embodiments, the transmissions discussed above are bidirectional data transmissions. Bidirectional data transmissions are sometimes utilized in videoconferencing applications and the like. In some embodiments, the encoded video bitstream 108 and/or the encoded video data 116 are encoded and/or decoded in accordance with any of the video coding/compressions standards described herein, such as HEVC, VVC, and/or AV1.

Figure 2A:
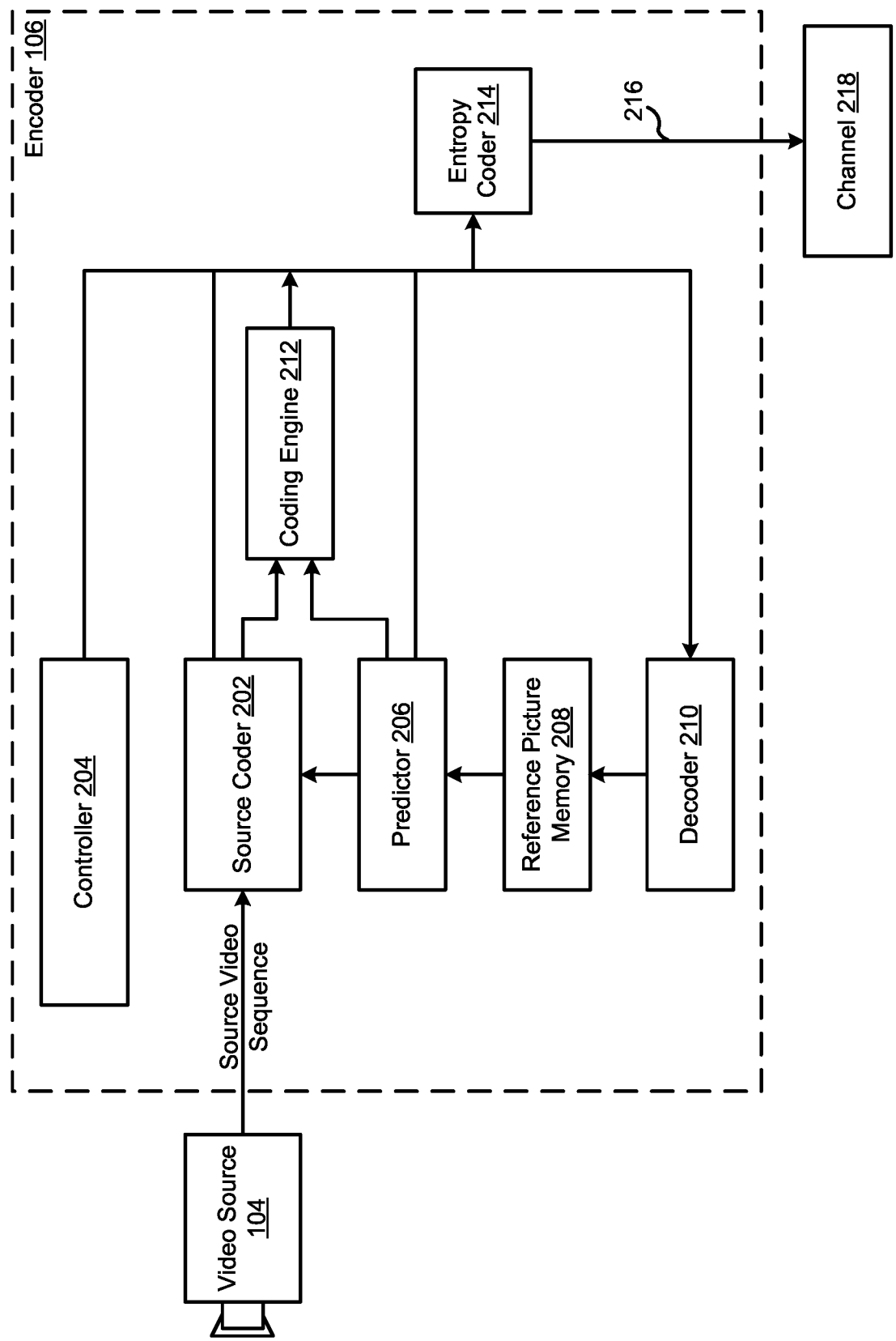
FIG. 2A is a block diagram illustrating example elements of an encoder component in accordance with some embodiments.

FIG. 2A is a block diagram illustrating example elements of the encoder component 106 in accordance with some embodiments. The encoder component 106 receives a source video sequence from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any color-space (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples. The description below focuses on samples.

The encoder component 106 is configured to code and/or compress the pictures of the source video sequence into a coded video sequence 216 in real-time or under other time constraints as required by the application. Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. In some cases, as determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
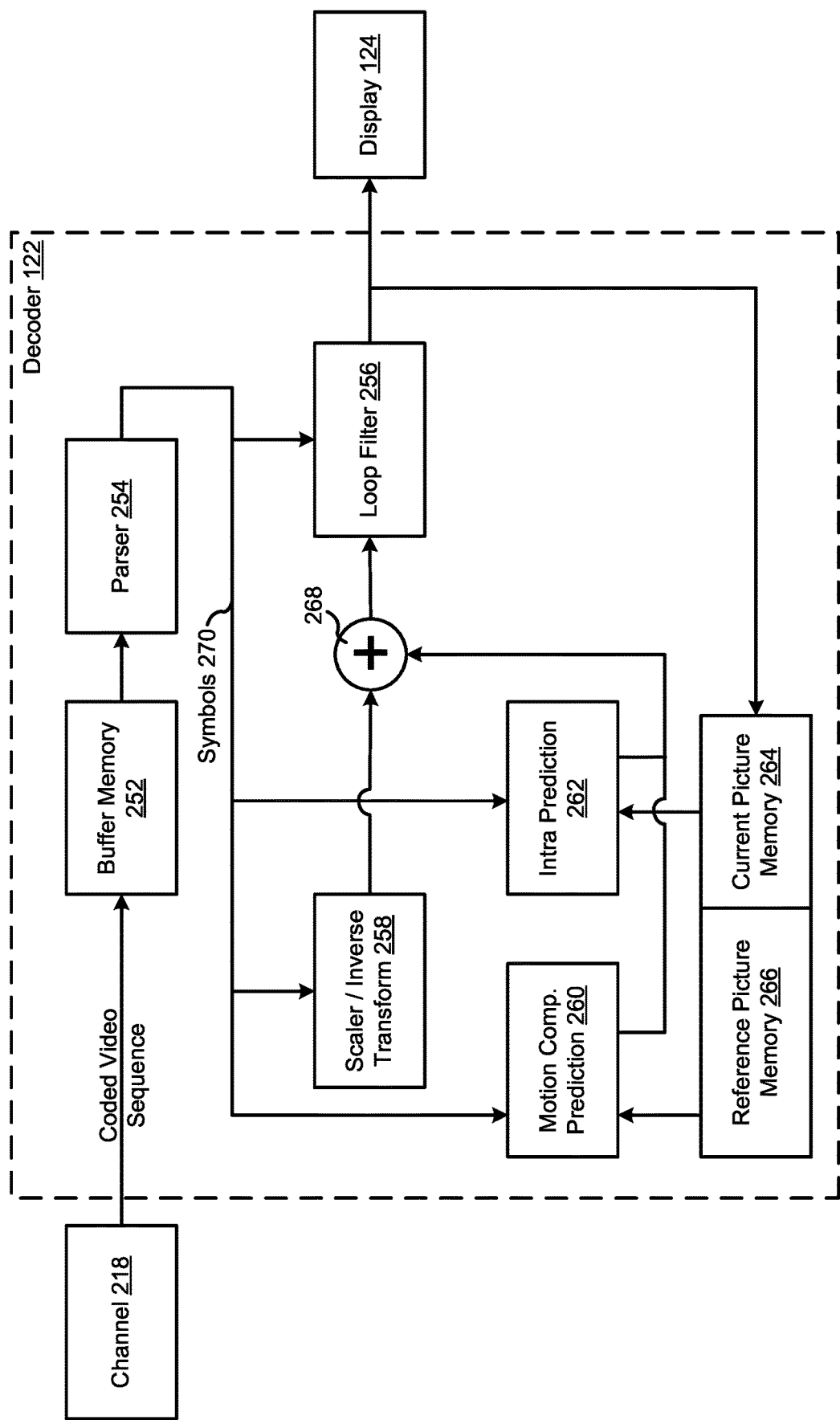
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, for example, temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. In some embodiments, the decoder component 122 is implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and can be advantageously of adaptive size, and may at least partially be implemented in an operating system or similar elements (not depicted) outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

Beyond the functional blocks already mentioned, decoder component 122 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is maintained.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values.

The output of the loop filter unit 256 can be a sample stream that can be output to a render device such as the display 124, as well as stored in the reference picture memory 266 for use in future inter-picture prediction.

Certain coded pictures, once fully reconstructed, can be used as reference pictures for future prediction. Once a coded picture is fully reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
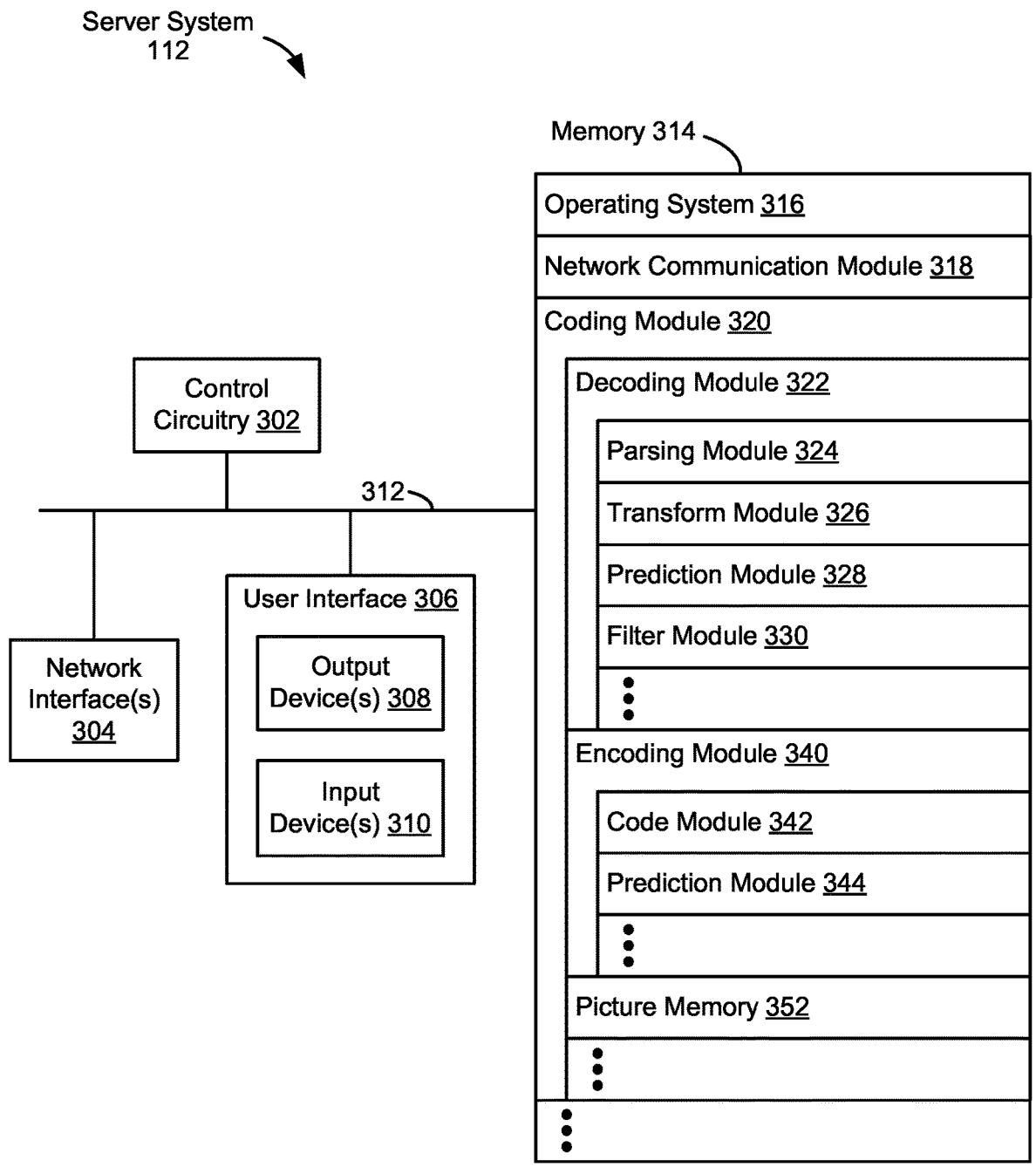
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or one or more integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:
- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
    - a decoding module 322 for performing various functions with respect to decoding encoded data, such as those described previously with respect to the decoder component 122; and
    - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

In some embodiments, the server system 112 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Example Intra Prediction Mode

Figure 4:
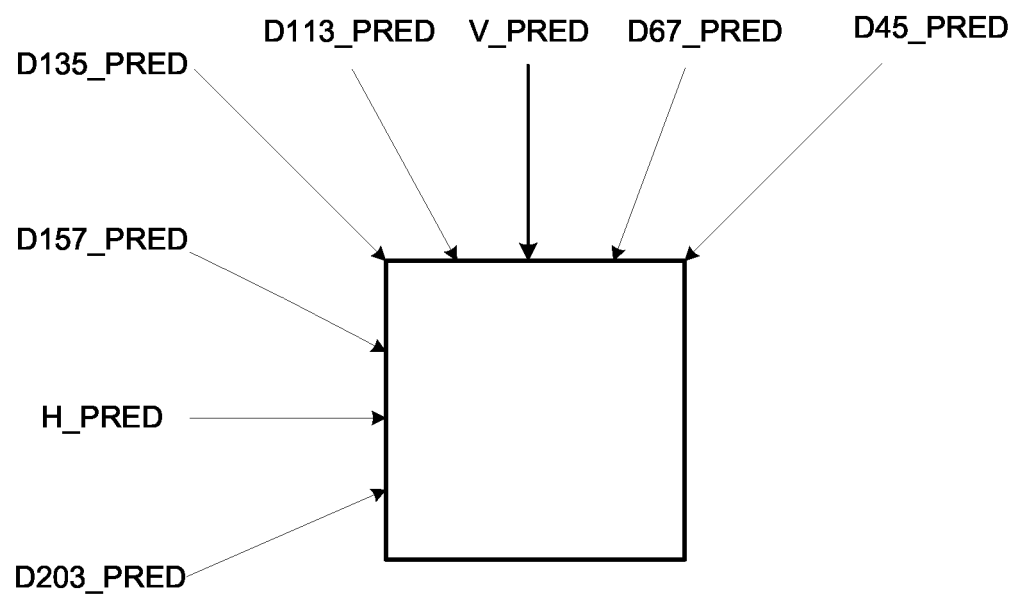
FIG. 4 illustrates nominal angles in directional intra-prediction, in accordance with some embodiments.

FIG. 4 illustrates nominal angles in directional intra-prediction, in accordance with some embodiments. In some implementations of intra prediction, to further exploit more varieties of spatial redundancy in directional textures, directional intra modes may be further extended to an angle set with finer granularity. For example, the VP9 coding format supports 8 directional modes corresponding to angles from 45 to 207 degrees. In some embodiments, these 8 directional modes are configured to provide eight nominal angles, referred to as V_PRED, H_PRED, D45_PRED, D135_PRED, D113_PRED, D157_PRED, D203_PRED, and D67_PRED, as illustrated in FIG. 4.

For each nominal angle, a predefined number (e.g., 7) of finer angles may be added. With such an extension, a larger total number (e.g., 56 in this example) of directional angles may be available for intra prediction, corresponding to the same number of predefined directional intra modes. In some embodiments, a prediction angle may be represented by a nominal intra angle plus an angle delta. For the particular example above with 7 finer angular directions for each nominal angle, the angle delta may be −3~3 multiplies a step size of 3 degrees. To implement directional prediction modes via a generic way, the directional intra prediction modes are implemented with a unified directional predictor that projects each pixel to a reference sub-pixel location and interpolates the reference pixel by a 2-tap bilinear filter.

In some embodiments, a predefined number of non-directional intra prediction modes may also be predefined and made available. For example, five non-directional intra prediction modes: DC, PAETH, SMOOTH, SMOOTH_V, and SMOOTH_H, may be specified. In some embodiments, the non-directional intra prediction modes are also known as non-directional smooth intra prediction modes.

Figure 5:
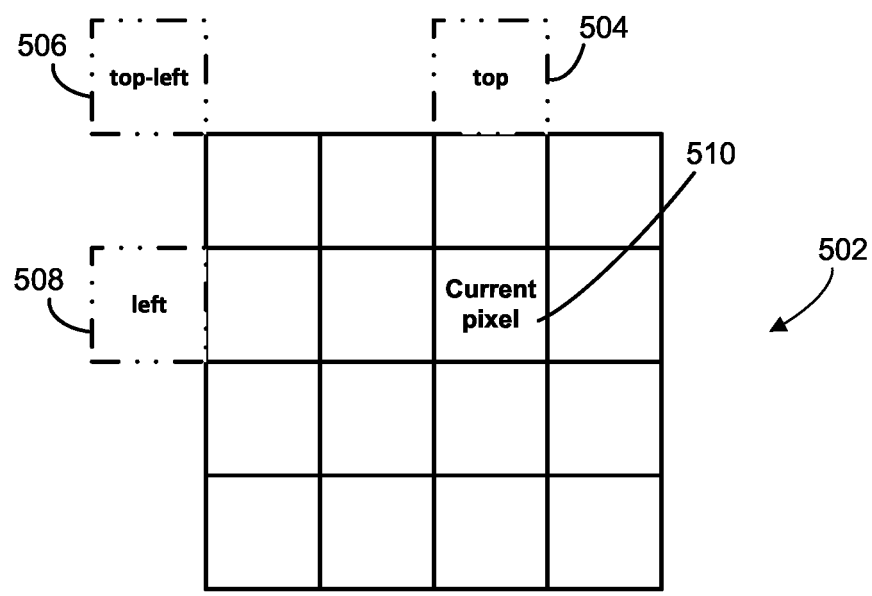
FIG. 5 illustrates top, left, and top-left positions for a PAETH intra prediction mode for predicting a coding block, in accordance with some embodiments.

Prediction of samples of a particular block under these example non-directional modes are illustrated in FIG. 5. FIG. 5 shows an example 4-pixel by 4-pixel block 502 that is predicted by samples from a top neighboring line and/or left neighboring line of the block. A current pixel 510 in block 502 may correspond to a sample 504 that is located at the top of the current pixel 510, a top-left sample 506 that is located at the intersection of the top and left neighboring lines, and a sample 508 that is located at the left of the current pixel 510. For DC intra prediction mode, the average of the left and above neighboring samples is used as the predictor of the block to be predicted. For PAETH intra prediction mode, the top, left and top-left reference samples are fetched, and then the value that is closest to (top+left−topleft) is set as the predictor for the pixel to be predicted. The SMOOTH, SMOOTH_V, and SMOOTH_H intra prediction modes predict the block 502 using quadratic interpolation in vertical or horizontal directions, or the average of both directions. The non-directional intra prediction modes described above are merely illustrative. It will be apparent to be of ordinary skill in the art that other neighboring lines or non-directional modes can be selected and/or combined to predicting samples for predicting a particular sample in a prediction block are also contemplated.

Selection of a particular intra prediction mode by the encoder from the directional or non-directional modes above at various coding levels (e.g., picture, slice, block, unit, etc.) may be signaled in the bitstream. In some embodiments, the exemplary 8 nominal directional modes together with 5 non-angular smooth modes (a total of 13 options) may be signaled first. In some embodiments, if the signaled mode is one of the 8 nominal angular intra modes, an index is further signaled to indicate the selected angle delta to the corresponding signaled nominal angle. In some embodiments, all intra prediction modes may be indexed all together (e.g., 56 directional modes plus 5 non-directional modes to yield 61 intra prediction modes) for signaling. In some embodiments, the example 56 or other number of directional intra prediction modes may be implemented with a unified directional predictor that projects each sample of a block to a reference sub-sample location and interpolates the reference sample by a 2-tap bilinear filter.

Figure 6:
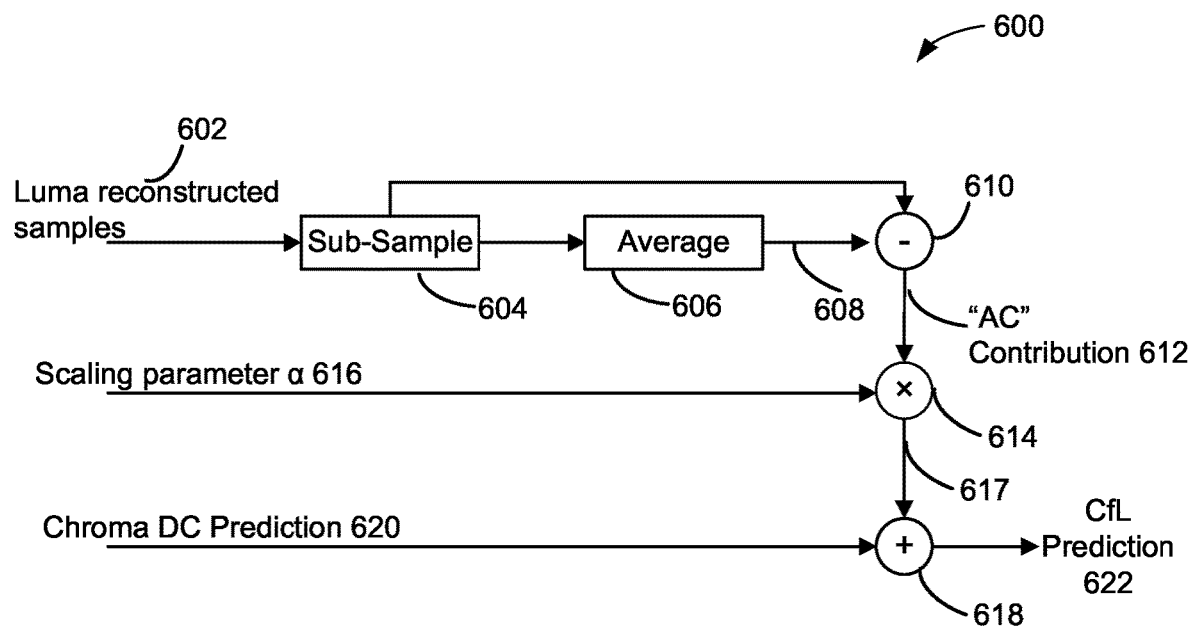
FIG. 6 is a block diagram illustrating a chroma from luma (CfL) prediction process, in accordance with some embodiments.

FIG. 6 is a block diagram illustrating a chroma from luma (CfL) prediction process 600 (e.g., executed by prediction module 328), in accordance with some embodiments. CfL is an intra prediction mode in which chroma pixels are modeled as a linear function of coincident reconstructed luma pixels. The CfL prediction is expressed as follows $$CfL(\alpha) = \alpha \times L_{AC} + DC \quad (1)$$

In equation (1), $L_{AC}$ denotes the alternating current (AC) contribution of the luma component, α denotes the parameter of the linear model, and DC denotes the direct current (DC) contribution of the chroma component.

FIG. 6 illustrates that in the CfL prediction process 600, reconstructed luma pixels 602 are subsampled (604) (e.g., downsampled) into the chroma resolution and then averaged (606) to obtain average values 608. The subsampled luma pixels are subtracted (610) by their average values 608 to form the AC contribution of the luma component 612. The AC contribution of the luma component 612 is then multiplied (614) by the scaling parameter a 616 (defined in equation (1) above) to generate a scaled AC contribution of the luma component 617. The scaled AC contribution of the luma component 617 is then added (618) to the DC contribution prediction of the chroma component (620) to obtain the chroma prediction samples (CfL prediction 622) of the predicted chroma block.

In some embodiments, to approximate chroma AC component from the AC contribution, instead of requiring the decoder to calculate the scaling parameters, the parameter a is determined (e.g., by prediction module 328) based on the original chroma pixels and is signaled in the bitstream. This reduces decoder complexity and yields more precise predictions. As for the DC contribution of the chroma component, it is computed using intra DC mode, which is sufficient for most chroma content and has mature fast implementations.

Figure 7:
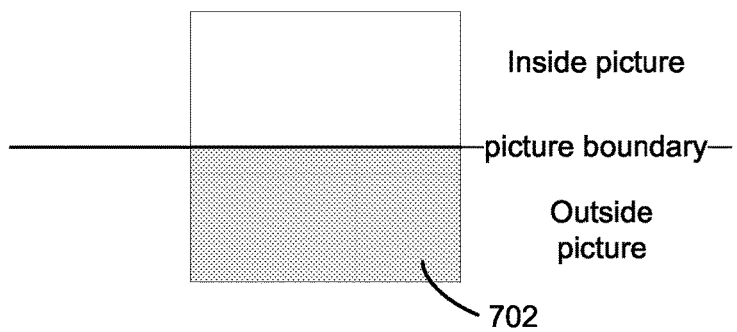
FIG. 7 shows a block diagram of luma samples inside of and outside of a picture boundary, in accordance with some embodiments.

In some embodiments, when some luma samples of a co-located luma block are outside of the picture boundary, these luma samples may be padded, and the padded luma samples may be used to calculate the luma average (block 606). FIG. 7 shows a block diagram of luma samples inside of and outside of a picture boundary, in accordance with some embodiments. The outside picture luma samples 702 may be padded by coping the values of the nearest available samples within the current block.

In CfL mode, the luma subsampling step is combined with the average subtraction step, as shown in FIG. 6. This way, not only are the equations simplified, but the subsampling divisions and the corresponding rounding error are also removed. Equation (2) corresponds to the combination of both steps, which is simplified to Equation (3). Both equations (2) and (3) use integer division. M×N is the matrix of pixels in the luma plane.

$$L_{u,v}^{AC} = 8\left(\frac{S(s_x, s_y, u, v)}{s_y/s_x}\right) - \frac{8\sum_i\sum_j\left(\frac{S(s_x, s_y, i, j)}{s_y \times s_x}\right)}{M \times N} \Rightarrow \quad (2)$$

$$\frac{1}{s_y \times s_x}\left(8 \times S(s_x, s_y, u, v) - \frac{\sum_i\sum_j 8\left(\frac{S(s_x, s_y, i, j)}{s_y \times s_x}\right)}{M \times N}\right) \quad (3)$$

Based on the supported chroma subsampling, it can be shown that $S_x \times S_y \in \{1, 2, 4\}$ and that since both M and N are powers of two, M×N is also a power of two.

For example, in the context of a 4:2:0 chroma subsampling, instead of applying a box filter, the proposed approach only requires summing the 4 reconstructed luma pixels that coincide with the chroma pixels. That is, a four-tap {¼, ¼, ¼, ¼} filter is used to downsample the co-located luma samples to align the chroma resolution. Afterwards, when CfL will scale its luma pixels to improve the precision of the prediction, whereas the proposed approach only needs to scale by 2.

Figure 8:
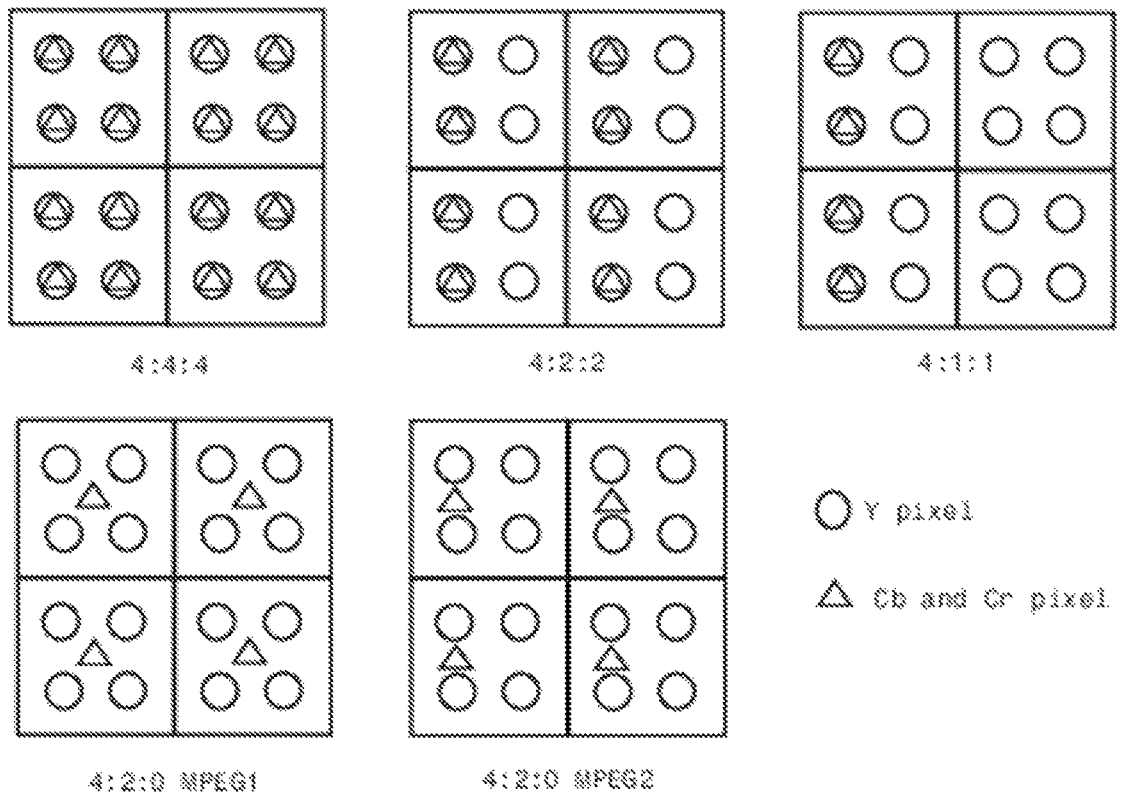
FIG. 8 illustrates different chroma downsampling formats, in accordance with some embodiments.

There can be different YUV formats depending on different chroma downsampling phases. FIG. 8 illustrates different chroma downsampling formats, in accordance with some embodiments. Different chroma formats define different down-sampling grids (phases) of different color components. For 4:2:0 format, there are two different typical downsampling formats, namely 4:2:0 MPEG1 or 4:2:0 MPEG2, as shown in FIG. 8.

In some embodiments, for a current luma downsampling filter in AV1, equation (4) is applied to derive the luma reconstructed samples:

$$Rec_L^{\prime(i,j)} = \left[\begin{array}{c} rec_L(2i-1, 2j-1) + rec_L(2i, 2j-1) + \\ rec_L(2i-1, 2j) + rec_L(2i, 2j) + 2 \end{array}\right] \gg 2 \quad (4)$$

Figure 9:
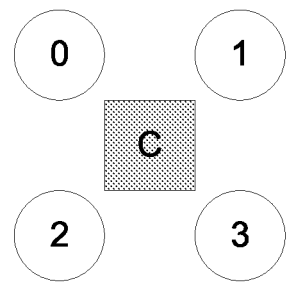
FIG. 9 illustrates an AV1 CfL downsampling filter, in accordance with some embodiments.

The downsampling filter in AV1 may assume a chroma downsampling format corresponding to the 4:2:0 MPEG1 downsampling format, as illustrated in FIG. 9. In some embodiments, multiple downsampling filters may be supported. For at least some of these embodiments, the filter type may be signaled, such as in a high level syntax. In some embodiments, the multiple filters may include one or more 4-tap filters in AVI, one or more 6-tap filters, and another 4-tap filter.

Figure 10:
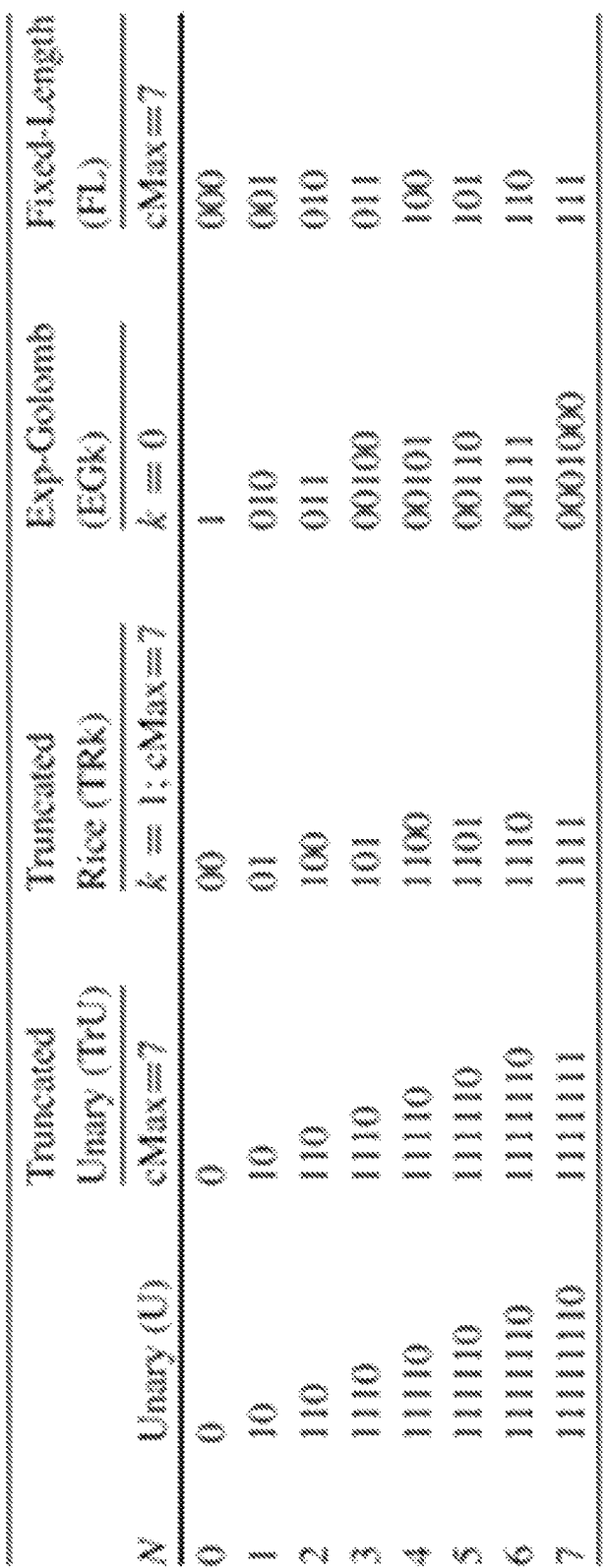
FIG. 10 illustrates binarization processes and their corresponding codes, in accordance with some embodiments.

In entropy coding, the syntax is binarized into 1s and 0s. FIG. 10 illustrates various binarization schemes and their corresponding codes (e.g., binary symbols or bins), in accordance with some embodiments. In general, a binarization scheme defines a unique mapping of syntax element values to sequences of binary symbols (e.g., bins), which can also be interpreted in terms of a binary code tree.

Several different binarization processes are used in HEVC including $k^{th}$ order truncated Rice (TRk), $k^{th}$ order Exp-Golomb (EGk), and fixed-length (FL) binarization. Parts of these forms of binarization, including the truncated unary (TrU) scheme as the zero-order TRk binarization, were also used in H.264/AVC. These various methods of binarization can be explained in terms of how they would signal an unsigned value N. Examples are also provided in FIG. 10.

Unary coding involves signaling a bin string of length N+1, where the first N bins are 1 and the last bin is 0. The decoder searches for a 0 to determine when the syntax element is complete. For the TrU scheme, truncation is invoked for the largest possible value cMax1 of the syntax element being decoded.

$k^{th}$ order truncated Rice is a parameterized Rice code that is composed of a prefix and a suffix. The prefix is a truncated unary string of value N k, where the largest possible value is cMax. The suffix is a fixed length binary representation of the least significant bins of N; k indicates the number of least significant bins. When k=0, the truncated Rice is equal to the truncated unary binarization.

$k^{th}$ order Exp-Golomb code is a robust, near-optimal prefix-free code for geometrically distributed sources with unknown or varying distribution parameter. Each codeword consists of a unary prefix of length $L_N$+1 and a suffix of length $L_N$+k, where $L_N$=log 2((N>>k)+1).

Fixed-length code uses a fixed-length bin string with length log 2(cMax+1) and with most significant bins signaled before least significant bins.

In some embodiments, the binarization scheme (e.g., process) is selected based on the type of syntax element. In some embodiments, the binarization scheme is selected depending on the value of a previously processed syntax element (e.g., binarization of coeff_abs_level_remaining depends on the previously decoded coefficient levels) or slice parameters that indicate whether certain modes are enabled. For example, binarization of partition mode, so-called part_mode, depends on whether asymmetric motion partition is enabled. The majority of the syntax elements use the binarization processes as listed above, or some combination of them (e.g., cu_qp_delta_abs uses TrU (prefix)+ EGO (suffix)). However, certain syntax elements (e.g., part_mode and intra_chroma_pred_mode) use custom binarization processes.

Figure 12:
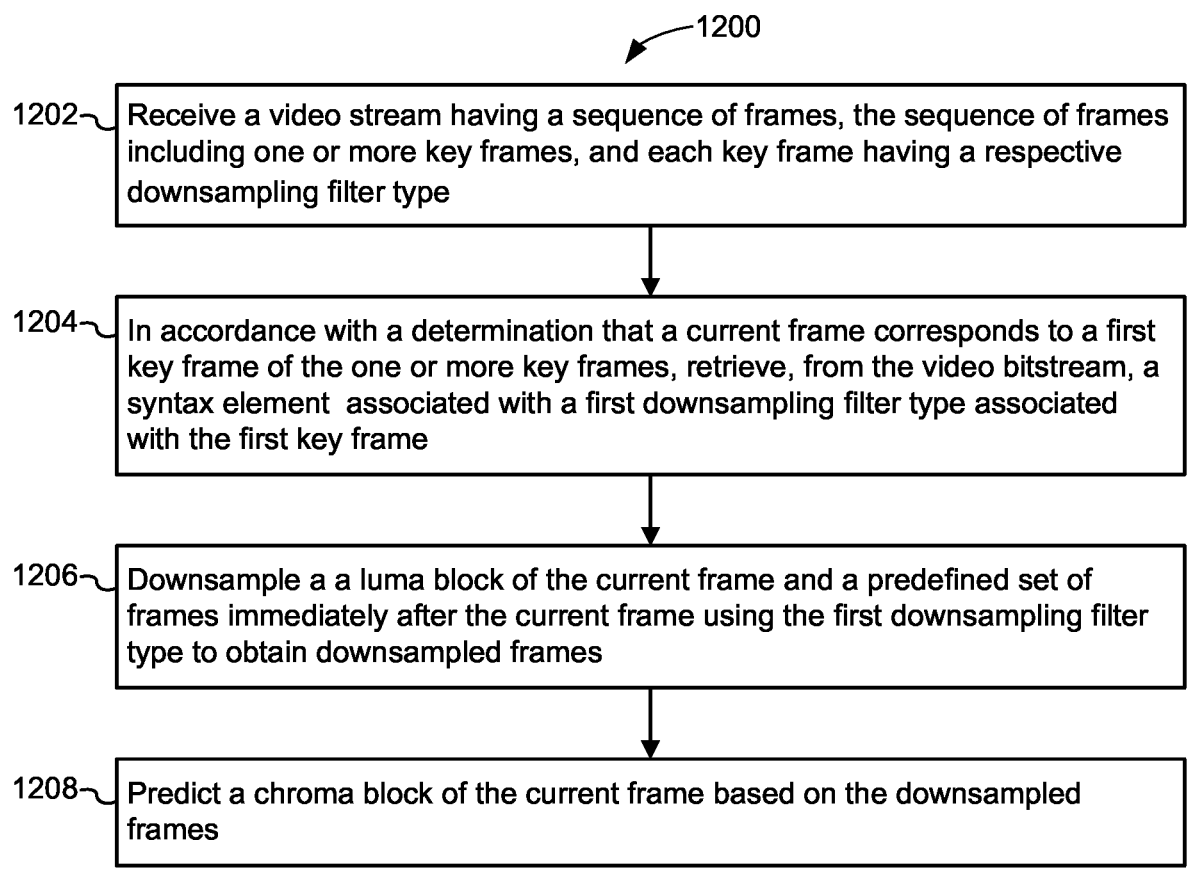
FIG. 12 is a flow diagram illustrating an example method of video decoding in accordance with some embodiments.

FIG. 12 is a flow diagram illustrating a method 1200 for video decoding in accordance with some embodiments. The method 1200 may be performed at a computing system (e.g., the server system 112, the source device 102, or the electronic device 120) having control circuitry and memory storing instructions for execution by the control circuitry. In some embodiments, the method 1200 is performed by executing instructions stored in the memory (e.g., the memory 314) of the computing system.

The system receives (1202) a video stream having a sequence of frames. The sequence of frames includes one or more key frames. Each key frame has a respective downsampling filter type. In accordance with a determination that a current frame corresponds to a first key frame of the one or more key frames, the system retrieves (1204), from the video bitstream, a syntax element (e.g., signal elements) associated with a first downsampling filter type associated with the first key frame (e.g., a syntax element is binarized into 1s and 0s). The system downsamples (1206) a luma block (e.g., a luma component, a block of luma pixels) of the current frame and a predefined set of frames immediately after the current frame using the first downsampling filter type to obtain downsampled frames. In some embodiments, the predefined set of frames are frames that are immediately after the current frame and immediately before a second key frame of the one or more key frames. The system predicts (1208) a chroma block (e.g., a chroma component, a block of chroma pixels) of the current frame (e.g., and the predefined set of frames immediately after the current frame) based on the downsampled frames.

In some embodiments, the downsampling filter type is signaled at each key frame. In some embodiments, the downsampling filter type is signaled at an Instantaneous Decoder Refresh (IDR) frame. In some embodiments, the downsampling filter type is signaled at each intra frame. In some embodiments, the downsampling filter type is signaled at several selected key frames. In some embodiments, the downsampling filter type is signaled at several selected intra frames.

Figure 11:
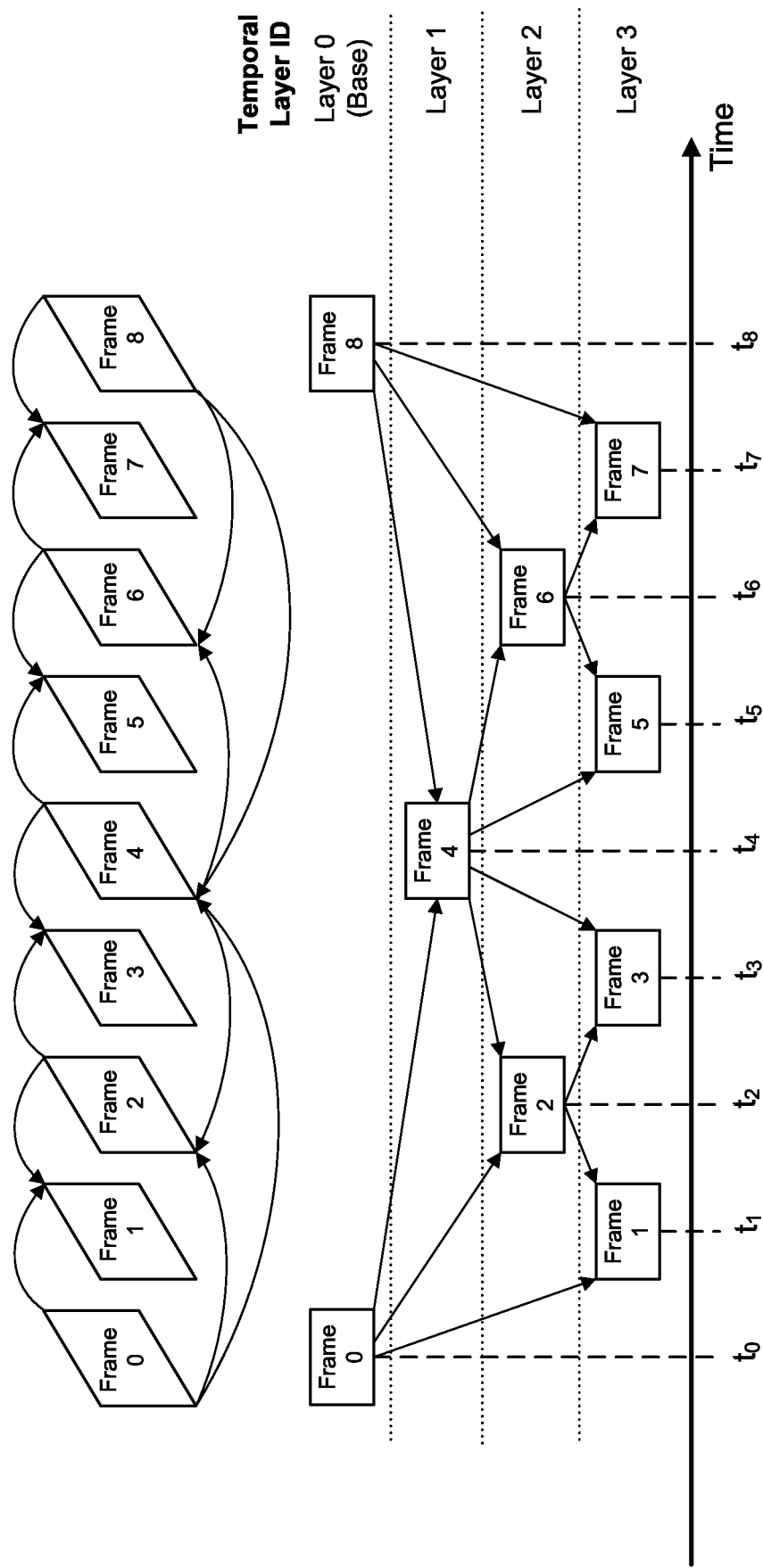
FIG. 11 illustrates temporal layer identifier numbers for 9 consecutive frames, in accordance with some embodiments.

In some embodiments, the downsampling filter type is signaled at selected inter frames. For example, the downsampling filter type is signaled at selected inter frames that are associated with a temporal layer identifier (ID) lower than a given threshold value (e.g., threshold value corresponding to layer 1, layer 2, layer 3, or layer 4). FIG. 11 shows an example that includes 9 consecutive frames of a video bitstream with four temporal layers, in accordance with some embodiments. The arrows show how the frames references other frames. For example, Frame 4 is a frame using bi-prediction that references Frame 0 and Frame 8, whereas Frame 3 is a frame using bi-prediction that references Frame 2 and Frame 4. In some embodiments, a video bitstream can include thousands or tens of thousands of frames with tens or hundreds of temporal layers, each of the layers having a respective temporal layer ID.

In accordance with some embodiments, the downsampling filter (or filter type) is signaled using one or more binarization methods (e.g., binarization schemes, FIG. 10).

In some embodiments, the downsampling filter type is signaled in fixed length coding. For example, when there are N types of filters, a fixed length of M bits is used to signal the N filters. 2M is the smallest integer number that is greater than or equal to N.

In some embodiments, the downsampling filter type is signaled in variable length coding. The downsampling filter type is binarized and signaled.

In some embodiments, the first bin for signaling the downsample filter is to indicate whether the filter type is a 6-tap filter.

In some embodiments, the semantics for the first bin of downsample filter depends on whether a current frame is detected as screen content. For example, if the current frame is detected as screen content, the first bin for signaling the downsample filter is used to indicate whether the co-located luma samples are directly used without filtering. If the current frame is detected as non-screen content, the first bin for signaling the downsample filter is used to indicate whether the filter type is a 6-tap filter.

In some embodiments, the downsample filter type can be binarized with Unary codeword (e.g., code). This is illustrated in FIG. 10.

In some embodiments, the downsample filter type can be binarized with Truncated Unary codeword (e.g., code). This is illustrated in FIG. 10.

In some embodiments, the downsample filter type can be binarized with Truncated Rice codeword (e.g., code). This is illustrated in FIG. 10.

In some embodiments, the downsample filter type can be binarized with Exp-Golomb codeword (e.g., code). This is illustrated in FIG. 10.

Table 1 illustrates an example Binary table when there are three filter types.

TABLE 1

Binary Table

| Filter type index | Unary | Truncated Unary | Truncated Rice, k = 1, max is 3 | Exp-Golomb | Fixed-length |
| --- | --- | --- | --- | --- | --- |
| 0 | 0 | 0 | 00 | 1 | 00 |
| 1 | 10 | 10 | 01 | 01 | 01 |
| 2 | 110 | 11 | 110 | 00 | 10 |

Although FIG. 12 illustrates a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

(A1) In one aspect, some embodiments include a method (e.g., the method 1200) for video decoding. In some embodiments, the method is performed at a computing system (e.g., the server system 112) having memory and control circuitry. In some embodiments, the method is performed at a coding module (e.g., the coding module 320). The method includes: (i) receiving a video stream having a sequence of frames, the sequence of frames including one or more key frames, and each key frame having a respective downsampling filter type; (ii) in accordance with a determination that a current frame corresponds to a first key frame of the one or more key frames, retrieving, from the video bitstream, a syntax element (e.g., a signal element) (e.g., a syntax element is binarized into 1s and 0s) associated with a first downsampling filter type associated with the first key frame; (iii) downsampling a luma block (e.g., a luma component, a block of luma pixels) of the current frame and a predefined set of frames immediately after the current frame using the first downsampling filter type to obtain downsampled frames; and (iv) predicting (e.g., using prediction module 344) a chroma block (e.g., a chroma component, a block of chroma pixels) of the current frame (e.g., and the predefined set of frames immediately after the current frame) based on the downsampled frames. In some embodiments, the predefined set of frames are frames that are immediately after the current frame and immediately before a second key frame of the one or more key frames.

(A2) In some embodiments of A1, the current frame includes a plurality of color components. The method further comprises downsampling a first color component of the plurality of color components of the current frame to obtain a first downsampled color component; and predicting other color components of the plurality of color components based on the first downsampled color component.

(A3) In some embodiments of A1 or A2, the one or more key frames comprise an intra frame.

(A4) In some embodiments of any of A1-A3, the one or more key frames correspond to every intra frame of the video stream.

(A5) In some embodiments of any of A1-A4, the one or more key frames comprise an Instantaneous Decoder Refresh (IDR) frame. An IDR frame is a special type of I-frame. An IDR frame specifies that no frame after the IDR frame can reference any frame before it.

(A6) In some embodiments of any of A1-A5, the one or more key frames comprise one or more inter frames, each of the one or more inter frames is associated with a temporal layer ID lower than a predetermined threshold value.

(A7) In some embodiments of any of A1-A6, the first downsampling filter type is a filter type corresponding to a Chroma from Luma (CfL) prediction mode for the video stream. In some embodiments, the first downsampling filter type is a filter type corresponding to a prediction mode that uses one color component to predict another color component and downsampling is required on one or more color components. In some embodiments, the first downsampling filter type is a filter type corresponding to a prediction mode when replacing luma with one specific color component (e.g., R) and chroma with another specific color component (e.g., G or B).

(A8) In some embodiments of any of A1-A7, the syntax elements have a fixed length coding.

(A9) In some embodiments of A8, the one or more key frames are associated with N downsampling filter types and the fixed length coding corresponds to M bits, wherein N and M are integers satisfying the relationship $N \leq 2^M$.

(A10) In some embodiments of any of A1-A9, the syntax element has a variable length coding.

(A11) In some embodiments of any of A1-A10, the syntax element includes a first attribute having an attribute value that indicates whether the first downsampling filter type is a 6-tap filter.

(A12) In some embodiments of any of A1-A11, the syntax element includes a first attribute having an attribute value that is determined based on whether the current frame corresponds to detected screen content (e.g., detected by encoding module 340).

(A13) In some embodiments of A12, when the current frame corresponds to detected screen content, the attribute value indicates whether co-located luma samples are used without applying any downsampling filter. When the current frame does not correspond to detected screen content, the attribute value indicates whether the downsampling filter type is a 6-tap filter.

(A14) In some embodiments of any of A1-A13, the syntax element is binarized using a Unary code (see, e.g., FIG. 10).

(A15) In some embodiments of any of A1-A14, the syntax element is binarized using a Truncated Unary code (see, e.g., FIG. 10).

(A16) In some embodiments of any of A1-A15, the syntax element is binarized using a Truncated Rice code (see, e.g., FIG. 10).

(A17) In some embodiments of any of A1-A16, the syntax element is binarized using am Exp-Golomb code (see, e.g., FIG. 10).

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A16 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A16 above).

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method for video decoding, performed at a computing system having one or more processors and memory, the method comprising:
   receiving a video stream having a sequence of frames, the sequence of frames including one or more key frames, and each key frame having a respective downsampling filter type;
   in accordance with a determination that a current frame corresponds to a first key frame of the one or more key frames, wherein the one or more key frames are associated with N downsampling filter types, N being an integer;
   retrieving, from the video stream, a syntax element associated with a first downsampling filter type associated with the first key frame, wherein the syntax element has a fixed length coding corresponding to M bits, M being an integer and satisfying a relationship $N \leq 2^M$;
   downsampling a luma block of the current frame and a predefined set of frames immediately after the current frame using the first downsampling filter type to obtain downsampled frames; and
   predicting a chroma block of the current frame based on the downsampled frames.

2. The method of claim 1, wherein the current frame includes a plurality of color components, the method further comprising:
   downsampling a first color component of the plurality of color components of the current frame to obtain a first downsampled color component; and
   predicting other color components of the plurality of color components based on the first downsampled color component.

3. The method of claim 1, wherein the one or more key frames comprise an intra frame.

4. The method of claim 1, wherein the one or more key frames correspond to every intra frame of the video stream.

5. The method of claim 1, wherein the one or more key frames comprise an Instantaneous Decoder Refresh (IDR) frame.

6. The method of claim 1, wherein the one or more key frames comprise one or more inter frames, each of the one or more inter frames is associated with a temporal layer ID lower than a predetermined threshold value.

7. The method of claim 1, wherein the first downsampling filter type is a filter type corresponding to a Chroma from Luma (CfL) prediction mode for the video stream.

8. The method of claim 1, wherein the syntax element includes a first attribute having an attribute value that indicates whether the first downsampling filter type is a 6-tap filter.

9. The method of claim 1, wherein the syntax element is binarized using a Unary code.

10. The method of claim 1, wherein the syntax element is binarized using a Truncated Unary code.

11. The method of claim 1, wherein the syntax element is binarized using a Truncated Rice code.

12. The method of claim 1, wherein the syntax element is binarized using am Exp-Golomb code.

13. The method of claim 1, wherein:
   the syntax element includes a first attribute having an attribute value that is determined based on whether the current frame corresponds to detected screen content.

14. The method of claim 13, wherein:
   when the current frame corresponds to detected screen content, the attribute value indicates whether co-located luma samples are used without applying any downsampling filter; and
   when the current frame does not correspond to detected screen content, the attribute value indicates whether the first downsampling filter type is a 6-tap filter.

15. A method for video encoding performed at a computing system having one or more processors and memory, the method comprising:
   receiving video data comprising a sequence of frames, the sequence of frames including one or more key frames, and each key frame having a respective downsampling filter type;
   determining that a current frame corresponds to a first key frame of the one or more key frames, wherein the one or more key frames are associated with N downsampling filter types, N being an integer; and
   encoding the current frame;
   wherein a video bitstream comprises the encoded current frame and a syntax element indicating a first downsampling filter type for the first key frame, wherein the syntax element has a fixed length coding corresponding to M bits, M being an integer and satisfying a relationship $N \leq 2^M$.

16. The method of claim 15, wherein the one or more key frames comprise an intra frame.

17. The method of claim 15, wherein the one or more key frames correspond to every intra frame of the video bitstream.

18. The method of claim 15, wherein the one or more key frames comprise an Instantaneous Decoder Refresh (IDR) frame.

19. The method of claim 15, wherein the one or more key frames comprise one or more inter frames, each of the one or more inter frames is associated with a temporal layer ID lower than a predetermined threshold value.

20. A method of processing visual media data, the method comprising:
   obtaining a source video sequence that comprises a plurality of frames; and
   performing a conversion between the source video sequence and a video bitstream of visual media data according to a format rule,
   wherein the video bitstream comprises a sequence of frames, the sequence of frames including one or more key frames, and each key frame having a respective downsampling filter type; and
   wherein the format rule specifies that when it is determined that a current frame corresponds to a first key frame of the one or more key frames, and the one or more key frames are associated with N downsampling filter types, N being an integer:
      a syntax element is to be retrieved from the video bitstream, the syntax element associated with a first downsampling filter type associated with the first key frame, wherein the syntax element has a fixed length coding corresponding to M bits, M being an integer and satisfying a relationship $N \leq 2^M$;

a luma block of the current frame and a predefined set of frames are to be downsampled immediately after the current frame using the first downsampling filter type to obtain downsampled frames; and a chroma block of the current frame is predicted based on the downsampled frames.

\* \* \* \* \*